April 7, 1942.                J. T. IVY                2,278,880
                              GEARING
                      Filed April 8, 1941           2 Sheets-Sheet 1
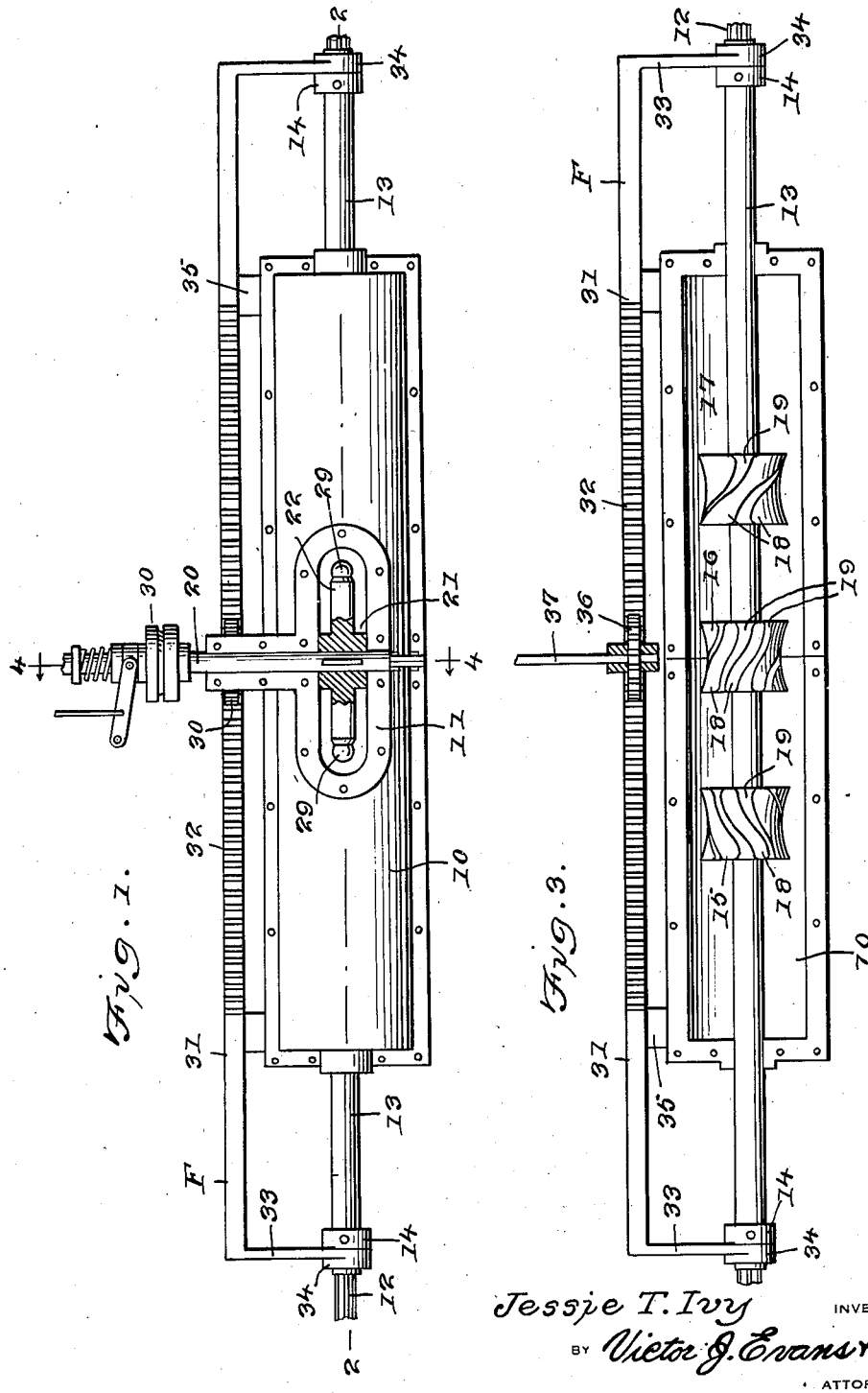
Jessie T. Ivy   INVENTOR
BY Victor J. Evans & Co.
ATTORNEYS April 7, 1942.                J. T. IVY                    2,278,880
                              GEARING
                        Filed April 8, 1941          2 Sheets-Sheet 2
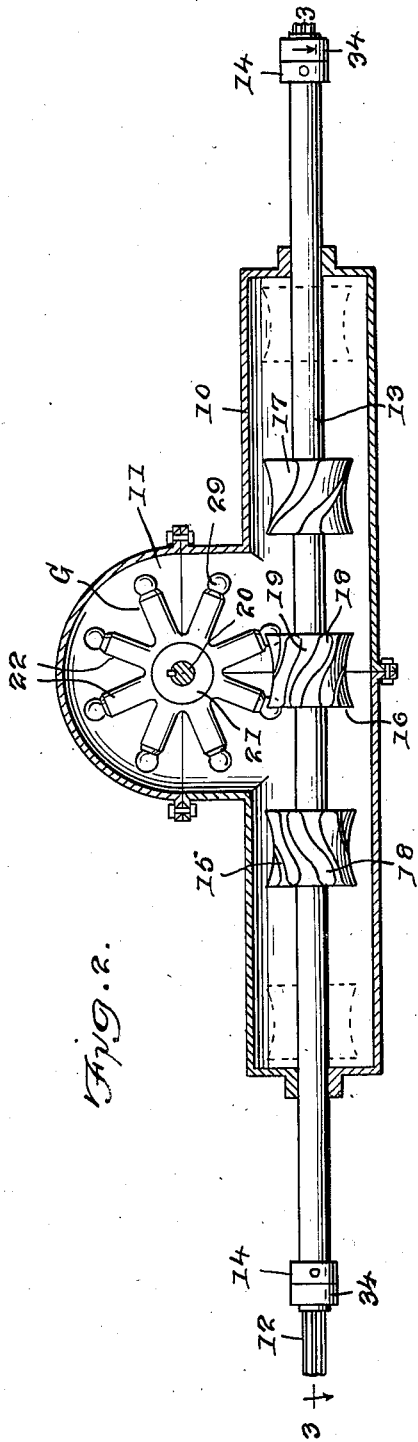
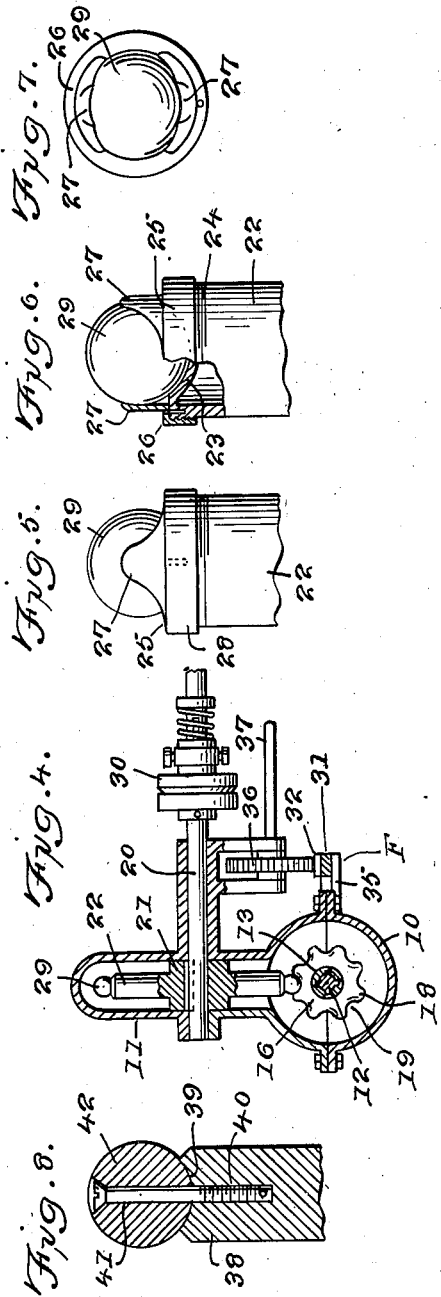
Jessie T. Ivy
INVENTOR
BY Victor J. Evans & Co.
ATTORNEYS Patented Apr. 7, 1942

2,278,880

UNITED STATES PATENT OFFICE 2,278,880

GEARING

Jessie T. Ivy, Seattle, Wash.

Application April 8, 1941, Serial No. 387,499

5 Claims. (Cl. 74—465)

The present invention relates to new and useful improvements in gearing applicable for driving aircraft propellers, automobiles and a variety of other uses.

An object of the invention is the provision of a gear mechanism designed to reduce friction to a minimum and thereby to reduce heating and prolong the life thereof.

Another object of the invention is the provision of gearing which is highly efficient for the change speed gear mechanism in automobiles and the like.

A further object of the invention is to provide gearing wherein rotary ball elements mounted in retainers on a gear wheel are operative to engage a complementary gear.

Other objects and advantages of the invention will become apparent as the description progresses.

In the accompanying drawings forming a part of this specification and in which like numerals are employed to designate corresponding parts throughout:

Figure 1 is a top plan view of a gear mechanism constructed in accordance with the invention with part of the casing removed, Figure 2 is a longitudinal section taken on line 2—2 of Figure 1, Figure 3 is a longitudinal section taken on line 3—3 of Figure 2, Figure 4 is a transverse section taken on line 4—4 of Figure 1, Figure 5 is an enlarged fragmentary side elevational view of one of the gear elements and its mounting, Figure 6 is a section at right angles thereto partly broken away to illustrate interior construction, Figure 7 is an end view of the same, and Figure 8 is a fragmentary sectional view illustrating a modified construction of the invention.

Referring to Figures 1 to 7 inclusive, wherein is illustrated a preferred embodiment of the invention and wherein like numerals of reference designate corresponding parts, 10 indicates an elongated cylindrical housing formed at its center portion with an upstanding relatively flat casing head 11, the latter advantageously having a removable cover portion while the housing body may be divided transversely at its center for convenient assembly of parts.

Extended longitudinally through the housing and projecting from each end thereof is a shaft 12 carrying thereon a tubular shaft section 13. As shown at Figure 4, these shafts are connected by a key or in any other suitable manner so that the external section will rotate the internal shaft therewith and is axially slidable thereon. This external tubular section is journaled in bearings in the ends of the housing and has secured on each end a collar 14, while on its intermediate portion it carries gears 15, 16 and 17 fixed thereon at uniformly spaced positions. These gears are formed with spiral teeth 18 forming therebetween spaces or grooves 19 and are preferably shaped to provide an axially curved concave periphery of both the teeth and grooves. As shown to advantage at Figures 2, 3 and 4, the teeth 18 of the spiral gears are advantageously rounded at each end to form a relatively wide flaring mouth at each end of the grooves between these teeth.

Mounted above and at right angles to the shaft 13 is a drive shaft 20 having its inner portion extended transversely through the casing head 11. On this inner portion of the shaft 20 within the head is keyed a gear wheel G embodying a hub 21 having arms or spokes 22 radiating therefrom. At the outer end each of the arms 22 is shaped to form a concave inwardly depressed socket-forming web 23 while the outer end portion of the arm is provided with screw threads 24. On this end portion of each arm is removably mounted a retainer member 25 embodying a body ring 26 having diametrically opposed axially protruding cupped portions 27 of tapering contour curved inwardly at their reduced tip parts to provide cradle sections. The periphery of the ring 26 is provided with an annular interiorly threaded flange 28 adapted to be screwed onto the threaded portion 24 of the arm. The retainers 25 are designed to hold, in projecting positions on the outer ends of the arms, a plurality of steel balls 29, assembled by initially seating the same upon the correspondingly curved concavity of the socket 23 formed at the outer end of each arm and thereafter fitting the retainer 25 over the ball and onto the end of the arm. When thus assembled the cradle projections 27 of the retainer are designed to embrace diametrically opposed minor segments of the spherical element and project outwardly beyond the medial portions of the ball so as to rotatably retain the ball on the end of the arm. Such mounting of the ball retains a large area of its surface, including diametrically opposed segments and an outer portion exposed for contact with a complementary gear. Thus, the cradle rotatably engages relatively small diametrically opposed sections of the ball on an axis transverse to the axis of the arm so that relatively large side segments therebetween protrude to make rotary contact with the teeth of the spiral gears by movement through the grooves between the teeth thereof. The balls are consequently universally rotatable in their retaining cages and have protruding faces engageable with the sides of the teeth of the spiral gears.

As illustrated at Figure 1, the drive shaft 20 may be composed of divided sections selectively engaged by suitable clutch mechanism 30 which may be of any preferred known character.

On the driven shaft 13 are mounted the ends of a rigid approximately U-shaped frame F embodying an elongated bar 31 having teeth 32 formed on its intermediate portion. At each end of the bar is formed a right angularly extending arm 33 formed at the end with a bearing ring 34 embracing the shaft 13 outwardly of each of the collars 14. The bar 31 is slidably supported at one side of the housing 10 by guide brackets 35 so that a spur gear 36 secured on an operating shaft 37 constantly meshes with the teeth of the rack portion 32.

The mechanism operates as follows:

Upon the operation of the shaft 37 either of the gears 15, 16 or 17 may be brought into central operating position in the housing 10. When the clutch 30 is engaged rotation of the shaft 20 causes rotation of the gear G in a plane approximately common with the axis of the shaft 13 so that the spherical elements or balls 29 mounted on the ends of the respective gear arms 22 are successively moved through the grooves 17 of the operating spiral gear and bear against faces of the teeth 18 thereof to impart rotary movement to the drive shaft 13. As shown to advantage at Figure 2 the gearing may advantageously be constructed so that the axial length of the teeth and grooves of each of the spiral gears corresponds to the arcuate dimension between centers of the balls 29 on adjacent arms of the drive gear so that as one of the balls is leaving a groove of the spiral gear the succeeding ball enters an adjacent groove. It is obvious that the relative operative speed of the shafts 20 and 13 is dependent upon the angular inclination of the teeth and grooves of the spiral gear members.

With this in mind the helix angles of the gears 16 and 17 are at variance so that when gear 16 is in operating position the driven shaft will revolve at a predetermined relatively low speed and when gear 17 is moved into engagement with the drive gear the shaft will be rotated at a higher speed. The teeth of the spiral gear 15 are formed at a reverse angle so that when this gear is brought into operative position the shaft 13 will be rotated in reverse direction.

As will be readily apparent the ends of driven shaft 13 may be connected in suitable manner with a pair of airplane propellers to drive the same from a common drive shaft and that the mechanism may be utilized for driving the wheels of an automobile as well as other purposes. The spherical or ball gear drive reduces gear engagement friction to a minimum so as to enable more efficient operation and prolong the life of the mechanism.

In the modified form of the invention, shown at Figure 8, the arms of the drive gear, indicated at 38, are of solid construction shaped at the outer extremity with a concave socket-forming depression 39. In each arm is formed a longitudinally extending interiorly threaded bore opening at the center of the socket and adapted to receive therein the inner threaded portion of a fastening screw 40. The outer headed portion of the screw extends through a countersunk bore 41 in a ball 42. Thus, in assembly, the spherical element or ball 42 is releasably secured so that its inner segmental portion engages the socket while its major surface is disposed outwardly thereof, the ball being revoluble about the screw to engage the teeth of the driven spiral gears in an antifriction manner.

It is to be understood that the forms of my invention herewith shown and described are to be taken as preferred and modified examples of the same and that various changes relative to the material, size, shape and arrangement of parts may be resorted to without departing from the spirit of the invention or the scope of the subjoined claims.

Having thus described my invention, I claim:

1. In a gear device having a peripheral extension, a depressed web formed in the end of the extension to provide an externally concave ball receiving seat, a retainer member detachably connected with the said extension, and cradle members projecting from the said retainer member shaped to embrace diametrically opposed minor segments of a ball on the seat to rotatably support the ball on the said gear extension.

2. In a gear, a tubular extension having a web formed to close the outer ends thereof and shaped to provide a concave ball receiving seat exteriorly of the extension, a retainer ring adapted for detachable connection with the end of the said tubular extension, and a pair of tapered cradle elements projecting from the retainer ring shaped to embrace diametrically opposed minor segments of a ball on the socket for rotatably supporting the ball in position on the said socket.

3. In a gear device having a tubular extension, a web formed in the outer ends of the said extension shaped to form a concave socket exteriorly thereof for seating therein a minor segmental portion of a ball, a retainer ring detachably fitted on the outer end of the tubular extension, and a pair of cradle elements projecting from the said ring and shaped to embrace diametrically opposed minor segments of the ball for rotatably supporting the ball on the socket of the said extension.

4. In a gear device having a tubular extension, a transverse web formed in the outer end of the said extension shaped to form an inwardly depressed configuration forming a concave socket exteriorly thereof for seating the inner minor segmental portion of a ball, the said extension being exteriorly screw threaded about the web carrying portion, a retainer ring interiorly screw threaded for screw connection with the threaded portion of the extension, and a pair of axially projecting tapered cradle elements formed on the ring and shaped to embrace diametrically opposed minor segments of a ball on an axis transverse to the axis of the extension for rotatably supporting the ball on the socket with a major portion thereof exposed for engagement with gear mechanism.

5. In a gear having a round extension and a concave socket in the outer end of the extension for seating a segment of a ball thereon, a retainer having a ring portion removably fitted on the outer end of the said extension, and a pair of cradle elements projecting outwardly of the ring and shaped to embrace diametrically opposed minor segments of a ball seated on the socket to rotatably support the ball thereon.

JESSIE T. IVY.